United States Patent
Yang

(10) Patent No.: US 7,361,129 B2
(45) Date of Patent: Apr. 22, 2008

(54) MULTI-AXIS AUTOMATIC TOOL-CHANGING SYSTEM

(75) Inventor: Su Fang Yang, Taichung (TW)

(73) Assignee: DAI-ICHI Machine Service Co., Taichung (TW)

( * ) Notice: Subject to any disclaimer, the term of this patent is extended or adjusted under 35 U.S.C. 154(b) by 0 days.

(21) Appl. No.: 11/756,612

(22) Filed: May 31, 2007

(65) Prior Publication Data

US 2008/0039306 A1 Feb. 14, 2008

(30) Foreign Application Priority Data

Aug. 11, 2006 (TW) .............................. 95214150 U

(51) Int. Cl.
*B23Q 3/157* (2006.01)
(52) U.S. Cl. ........................... 483/42; 483/39; 483/62; 483/68; 483/902; 483/2
(58) Field of Classification Search ................ 483/902, 483/2, 1, 30, 36, 38–44, 50, 62, 68
See application file for complete search history.

(56) References Cited

U.S. PATENT DOCUMENTS

| | | | | |
|---|---|---|---|---|
| 3,760,491 A | * | 9/1973 | Zankl et al. .................. 483/43 |
| 3,760,958 A | * | 9/1973 | Lohneis ........................ 483/44 |
| 4,144,975 A | * | 3/1979 | Tsuboi et al. ................ 483/902 |
| 4,221,043 A | * | 9/1980 | Dailey .......................... 483/44 |
| 4,670,965 A | * | 6/1987 | Sato et al. ..................... 483/46 |
| 5,133,128 A | * | 7/1992 | Katayama et al. ............. 483/44 |
| 5,336,025 A | * | 8/1994 | Ozawa et al. ................. 408/46 |
| 5,554,087 A | * | 9/1996 | Hwang et al. ................ 483/62 |
| 6,042,524 A | * | 3/2000 | Kato ............................ 483/62 |
| 6,450,932 B1 | * | 9/2002 | Hirose et al. ................. 483/40 |
| 6,626,809 B2 | * | 9/2003 | Hwang ........................ 483/62 |

FOREIGN PATENT DOCUMENTS

| JP | 61-270047 A | * | 11/1986 |
|---|---|---|---|
| JP | 02-015939 A | * | 1/1990 |

* cited by examiner

*Primary Examiner*—Erica Cadugan
(74) *Attorney, Agent, or Firm*—Banger Shia

(57) ABSTRACT

A multi-axis automatic tool-changing system for an automatic machining center which is disposed with a plurality of machining principal axes and a tool magazine. The tool magazine is disposed with a plurality of tool-changing positions located correspondingly to the machining principal axes. Between each machining principal axis and each tool-changing positions is disposed a tool-changing arm. Each tool-changing arm utilizes the first end and the second end tool-taking grooves to grasp and exchange the tools of the machining principal axes and the tool-changing positions.

10 Claims, 6 Drawing Sheets

MULTI-AXIS AUTOMATIC TOOL-CHANGING SYSTEM

BACKGROUND OF THE INVENTION

1. Field of the Invention

The present invention relates to a tool-changing operation of an automatic machining center, and more particularly to a multi-axis automatic tool-changing system for an automatic machining center.

2. Description of the Prior Art

Automatic machining center generally comprises a workpiece-holding table, a mainframe, a plurality of principal machining axes disposed on the mainframe, a tool magazine disposed adjacent to one side of the mainframe and a tool changing arm. The operation of this automatic machining center is to use the tools on the machining principal axes to perform the machining in the predetermined forms. The tool arm can be rotated to exchange the tools on the machining principal axes with the selected tools of the tool magazine.

For a lot of the manufacturers, the automatic machining center is quite expensive. But according to the abovementioned form, at a time, only one main axis can be used to perform only one type of machining operation onto one workpiece, so the production capacity is limited. One feasible method of solving this limited condition is to install a group or more than one group of machining assistant principal axes on the standard automatic machining center in a direction which is parallel to the principal axes, so as to form a multi-axis mainframe. The application of the assistant principal axes determined by the design, for example, the assistant principal axis may be used to provide the high rotation speed and low horsepower machining, but the principal axis continues to perform the low rotation speed and high torque cutting. The improved multi-axis can increase the number of the finished products within the same time. However, the facing problem is that it needs to avoid collision at the time of the multi tool arm changing during operation.

The present invention has arisen to mitigate and/or obviate the afore-described disadvantages.

SUMMARY OF THE INVENTION

The primary objective of the present invention is to provide a multi-axis automatic machining center, and the tool magazine disposed on the machining center is a chain type tool magazine used to cooperate with the exchanging operation of the tools, thus achieving the objective of improving the machining efficiency.

With respect of the multi-axis automatic tool changing system for an automatic machining center of the present invention, the automatic machining center comprises a workpiece-holding table, a mainframe, a tool magazine disposed adjacent to one side of the mainframe) a plurality of tool-changing arms. The tool magazine includes a plurality of tool pots, and one tool pot is used for an insertion of one tool. The tool magazine is disposed with a plurality of tool-changing positions. The mainframe is disposed with a plurality of machining principal axes. Between each machining principal axis and each tool-changing positions is disposed a tool-changing arm. Each tool-changing arm includes an axis at the center thereof and is driven by a driving device to rotate around its axis. Each tool-changing arm includes a first end tool-taking groove and a second end tool-taking groove. Each tool pot located correspondingly to each tool-changing position is controlled by a tool-reversing unit to rotate the tool pots and the tools vertical to the machining principal axes to a position parallel to machining principal axes, so as to facilitate each tool-changing arm utilizing its first end and second end tool-taking grooves to grasp and exchange the tools of the machining principal axes and the tool-changing positions.

The first objective and efficacy of the present invention are to make the standard automatic machining center have a multi-axis automatic tool-changing system, add machining principal axes and tools on the mainframe, and utilize the automatic tool-changing system to achieve the function of multi-axis tool-changing at a time and improve the production efficiency.

The second objective and efficacy of the present invention are to make each tool-changing arm have enough space to avoid each other in a differential rotation manner for preventing from colliding with the tools, when the automatic tool-changing system utilize its tool-changing arms to carry out the multi-axis tool changing operation at a time.

The third objective and efficacy of the present invention are to enable the tool-changing arms of the automatic tool-changing system to rotate 90 degrees to carry out the multi-axis tool changing operation.

The fourth objective and efficacy of the present invention are to enable the tool-changing arms of the automatic tool-changing system to rotate 180 degrees to carry out the multi-axis tool changing operation.

DETAILED DESCRIPTION OF THE PREFERRED EMBODIMENTS

The present inventions will be clearer from the following description when viewed together with the accompanying drawings, which show, for purpose of illustrations only, the preferred embodiment in accordance with the present invention.

Figure 1:
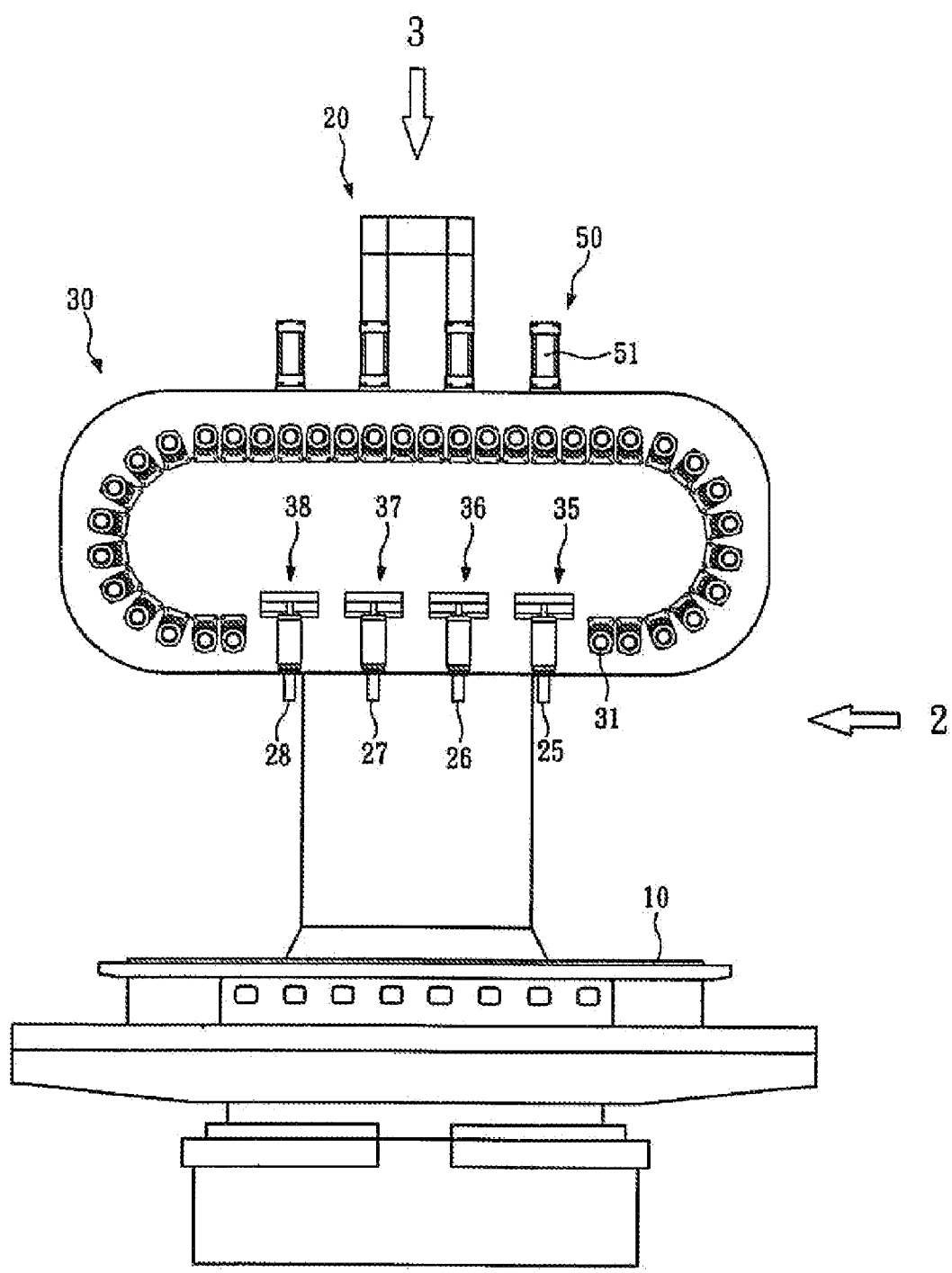
FIG. 1 is a front view of an automatic machining center in accordance with the present invention.
Figure 2:
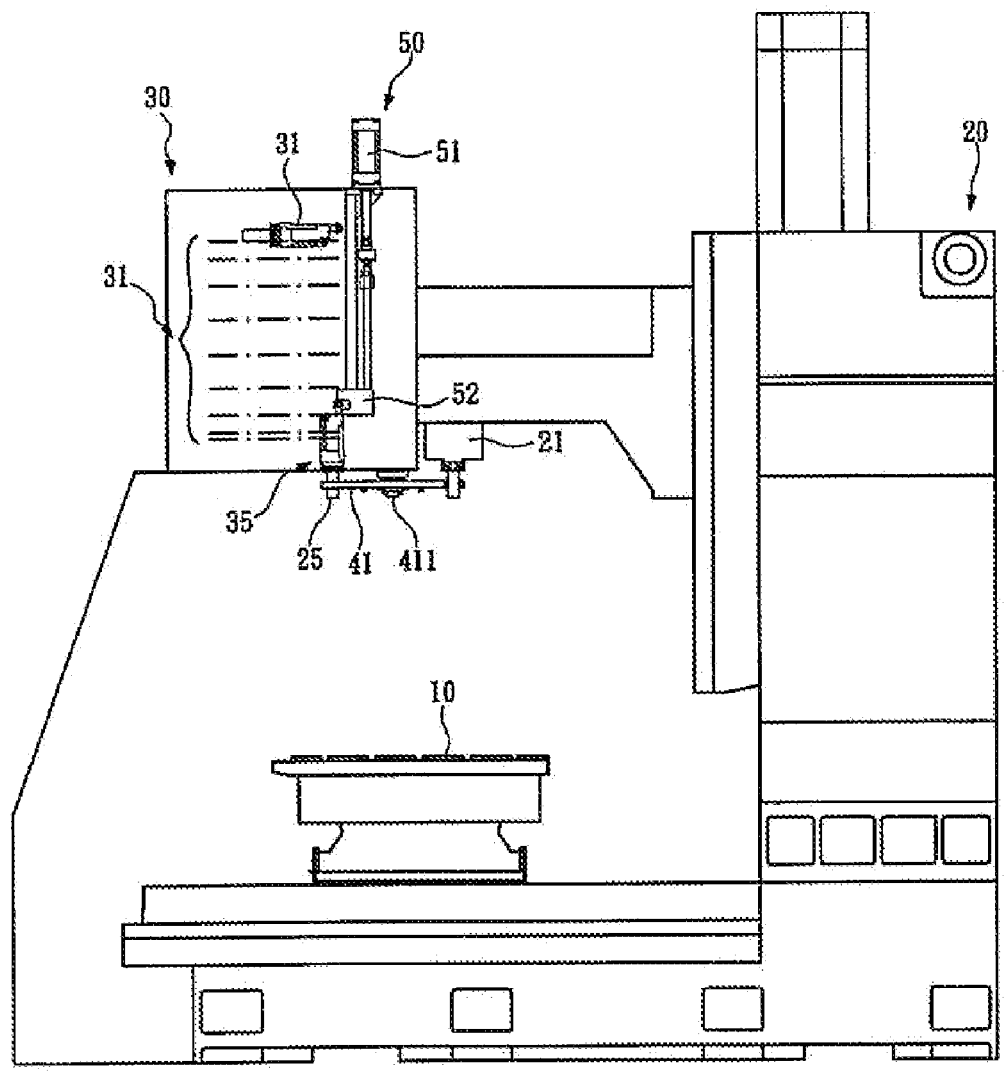
FIG. 2 is a side view of the automatic machining center indicated by the arrowhead 2 in FIG. 1 in accordance with the present invention.
Figure 3:
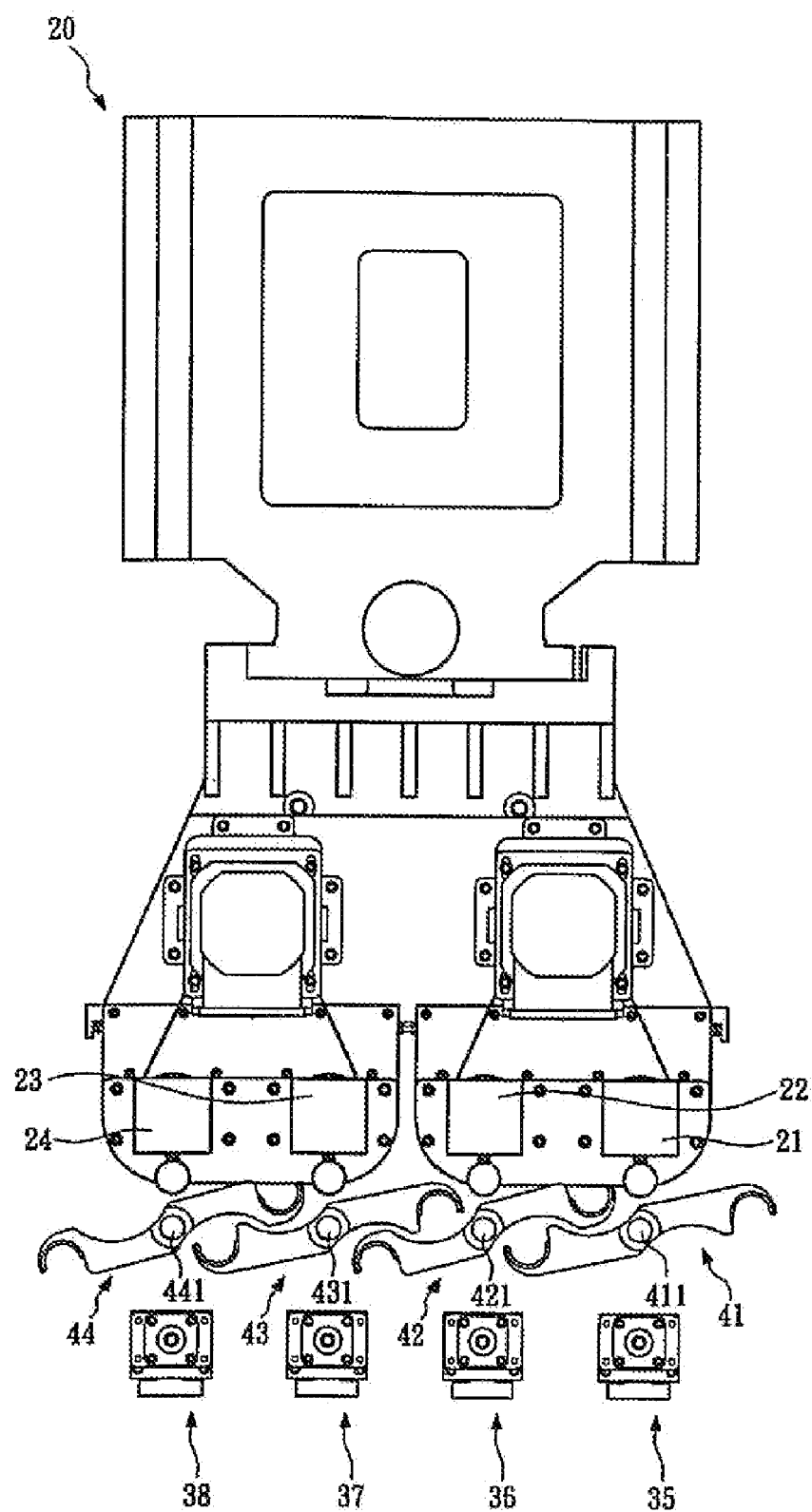
FIG. 3 is a top view of the automatic machining center indicated by the arrowhead 3 in FIG. 1 in accordance with the present invention.

Referring to FIGS. 1-3, an automatic machining center in accordance with a preferred embodiment of the present invention essentially comprises a workpiece-holding table 10, a mainframe 20, a plurality of machining principal axis 21 disposed on the mainframe 20, a tool magazine 30 disposed adjacent to one side of the mainframe 20, a plurality of tool-changing arms 41, 42, 43, 44 and a tool reversing unit 50. In this embodiment, four tool-changing arms 41, 42, 43, 44 are used to change four machining tools 25, 26, 27, 28 at a time. Of course, with the structure of the present invention, the modes of two or more than four also can achieve the same objective.

The tool magazine 30 of the automatic machining center is a chain type tool magazine and includes a plurality of tool pots 31. One tool pot is only provided for the insertion of one tool, and the plurality of tool pots 31 is driven to discontinuously run along a closed path. The tool magazine 30 is set with four tool changing positions 35, 36, 37, 38.

The mainframe 20 also includes four machining principal axes or machining devices 21, 22, 23, 24 to achieve the multi-axes machining objective.

Between each machining principal axis 21, 22, 23, 24 and each tool changing position 35, 36, 37, 38 is disposed a tool changing arm 41, 42, 43, 44, so as to carry out the tool changing operation of the tools on the machining principal axes 21, 22, 23, 24 and the tool changing positions 35, 36, 37, 38.

The abovementioned tool pots 31 of the tool changing positions 35, 36; 37, 38 is controlled by the tool reversing unit 50 to rotate the tool pots 31 vertical to the machining principal axes 21, 2, 23, 24 to a position parallel to the machining principal axes 21, 22, 23, 24. That is to say the four tools of the tool changing positions 35, 36, 37, 38 will turn from horizontal direction to vertically downward direction, so as to make the tool changing arms 41, 42, 43, 44 easily grasp the tools.

Figure 4:
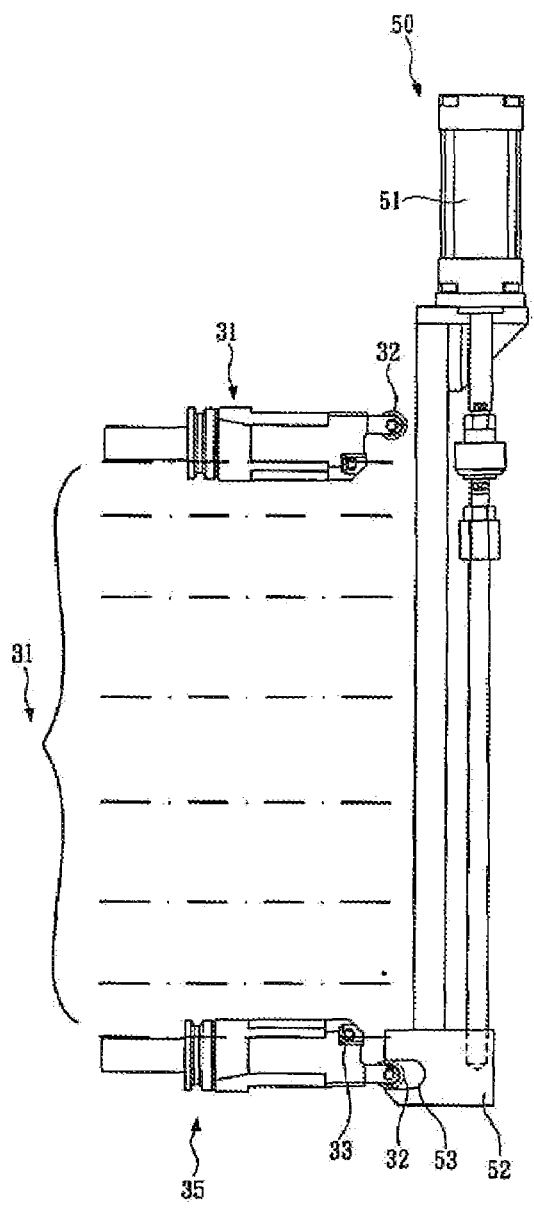
FIG. 4 is a side view of a tool-reversing unit of FIG. 2 in accordance with the present invention.
Figure 5:
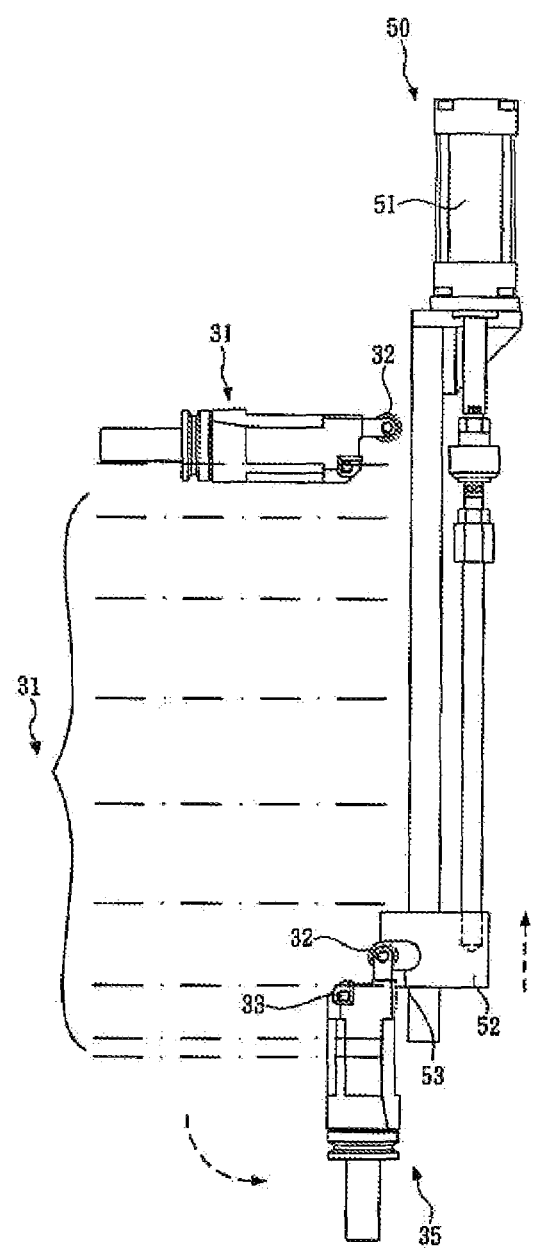
FIG. 5 shows the tool-reversing motion of the tool-reversing unit of FIG. 2 in accordance with the present invention.

As shown in FIGS. 4-5, the tool-reversing unit 50 includes a pressure cylinder 51 (hydraulic cylinder or air pressure cylinder) serving to directly drive a tool inversing block 52. The tool inversing block 52 is disposed with a groove 53 for a passage of the roller 32 at one end of the tool pot 31. When reversing the tool, the tool reversing block 52 is driven to move up and down by the pressure cylinder 51 to drive the roller 32, so as to make the tool pot 31 rotate 90 degrees around its rotation axis 33, thus achieving the tool-reversing objective.

After the tool-reversing operation is performed at the tool-changing positions 35, 36, 37, 38, the abovementioned tool-changing arms 41, 42, 43, 44 can grasp and exchange the tools on the machining principal axes 21, 22, 23, 24 and the tool changing positions 35, 36, 37, 38. The structures of the tool-changing arm 41, 42, 43, 44, and the technology of grasping and changing the tool are the same as the conventional one. However; the emphasis of the present invention is to prevent the tool-changing arms from colliding with the tools when the four tool-changing arms synchronously grasp and change the tools.

Figure 6:
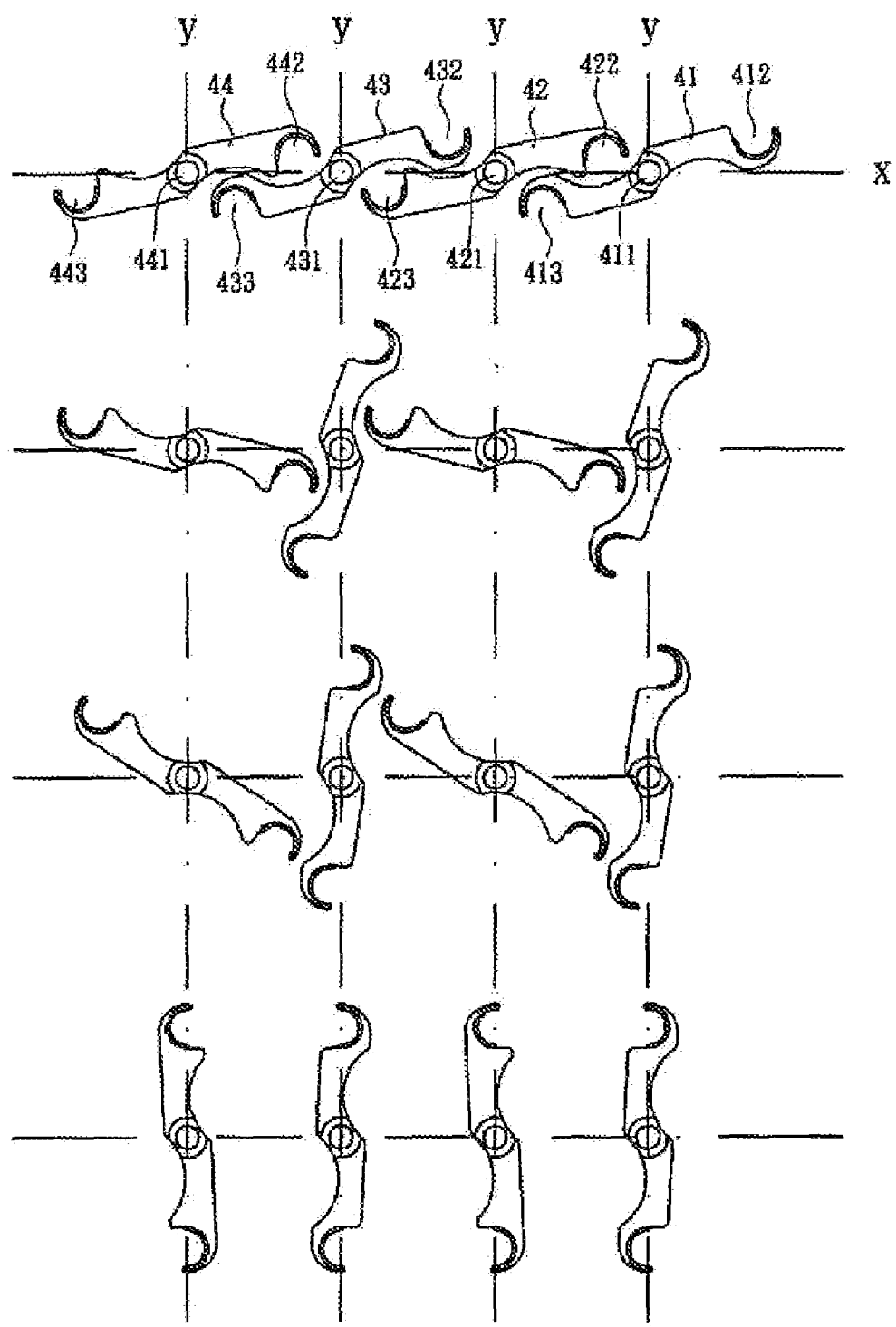
FIG. 6 shows that a plurality of tool-changing arms performs a 90 degrees tool-changing operation in accordance with the present invention.

As shown in FIG. 6, if the angle between the machining principal axis and the tool-changing positions is 90 degrees, the tool-changing system can carry out the 90 degrees automatic tool-changing operation. In order to facilitate the presentation, in FIG. 6, the applicant draws an imaginative horizontal axis X and an imaginative vertical axis Y through the axes 411, 421, 431, 441 of each tool-changing arm 41, 42, 43, 44 and the four tool-changing arms are called the first, the second, the third, and the fourth tool-changing arm 41, 42, 43, 44. Each tool-changing arm 41, 42, 43, 44 is driven to rotate around its own axis 411, 421, 431, 441 by a driving device (not shown).

Each tool-changing arm 41, 42, 43, 44 has a first end tool-taking groove 412, 422, 432, 442 and a second end tool-taking groove 413, 423, 433, 443. The open directions of the first end tool-taking grooves 412, 422, 432, 442 and the second ends tool-taking groove 413, 423, 433, 443 are opposite. The open directions of the first end tool-taking groove 412, 432 of the first and the third tool-changing arms 41, 42 are the same, and the open directions of the second end tool-taking grooves 413, 433 are also the same. The open directions of the first end tool-taking groove 422, 442 of the second and the fourth tool-changing arms 42, 44 are the same, and the open directions of the second end tool-taking grooves 423, 443 are also the same. But, the open directions of the first end tool-taking grooves 412, 422 of the first and the second tool-changing arms 41, 42 are opposite, and the second end tool-taking grooves 413, 423 are also opposite. The third and the fourth tool-changing arms 43, 44 are the same as the first and second tool-changing arms.

The first to the fourth tool-changing arms 41, 42, 43, 44 are driven to rotate by their own driving devices. As shown in FIG. 6, the first and the third tool-changing arms 41, 43 are rotating slowly in the clockwise direction, so as to make the first end tool-taking grooves 412, 432 rotate downwards from X axis to Y axis, and the second end tool-taking grooves rotate upwards form the X axis to Y axis. It can be found that, the first and the second tool-changing arms 41, 43 rotate about 90 degrees from horizontal state to the vertical state. At the same time of the first and the third tool-changing arms 41, 43 starting to rotate, the second and the fourth tool-changing arms 42, 44 also start to rotate slowly in the counterclockwise direction. But their rotating angles are different from that of the first and the third tool-changing arms 41, 43, and the first end tool-taking grooves 422, 442 are made to rotate upwards from X axis to the Y axis, and the second end tool-taking grooves 423, 443 are made to rotate downwards from X axis to Y axis. It can be found that, the rotating angles of the second and the fourth tool-changing arms 42, 44 are about 90 degrees.

As known from FIG. 6, even four tool-changing arms can utilize the differential rotation caused by the rotating direction, rotating angle and the rotation starting time to make respective tool-changing arms have enough space to avoid each other for preventing from colliding with the tools.

Figure 7:
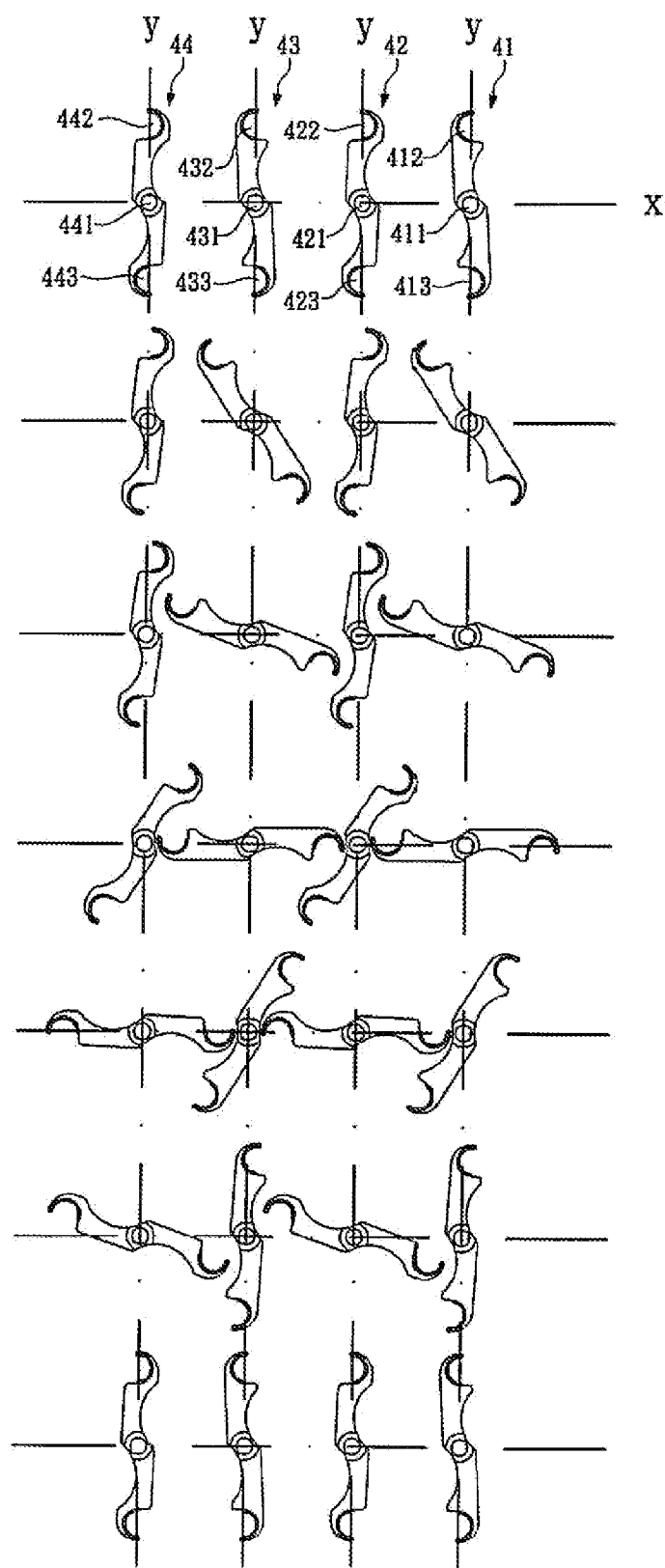
FIG. 7 shows that a plurality of tool-changing arms performs a 180 degrees tool-changing operation in accordance with the present invention.

As shown in FIG. 7, if the angle between the machining principal axis and the tool-changing positions is 180 degrees, the multi-axis automatic tool-changing system can carry out the 180 degrees automatic tool changing operation. In FIG. 7, the applicant draws an imaginative horizontal axis X and an imaginative vertical axis Y through the axes 411, 421, 431, 441 of each tool-changing arm 41, 42, 43, 44, and the four tool-changing arms are stilled called the first, the second, the third and the fourth tool-changing arms 41, 42, 43, 44. Each tool-changing arm is driven by a driving device (not shown) to rotate around its axis 411, 421, 431, 441.

Each tool-changing aim 41, 42, 43, 44 has a first end tool-taking groove 412, 422, 432, 442 and a second end tool-taking groove 413, 423, 433, 443. The open directions of the first end tool-taking grooves 412, 422, 432, 442 and the second end tool-taking groove 413, 423, 433, 443 are opposite. The open directions of the first end tool-taking groove 412, 432 of the first and the third tool-changing arms 41, 42 are the same, and the open directions of the second end tool-taking grooves 413, 433 are also the same. The open directions of the first end tool-taking groove 422, 442 of the second and the fourth tool-changing arms 42, 44 are the same, and the open directions of the second end tool-taking grooves 423, 443 are also the same. But, the open directions of the first end tool-taking grooves 412, 422 of the first and the second tool-changing arms 41, 42 are opposite, and the second end tool-taking grooves 413, 423 are also opposite. The third and fourth tool-changing arms 43, 44 are the same as the first and second.

The first to the fourth tool-changing arms 41, 42, 43, 44 are controlled by their own driving devices to rotate. As shown in FIG. 7, the first and the third tool-changing arms 41, 43 are slow rotating in the counterclockwise direction, so as to make the first end tool-taking grooves 412, 432 rotate downwards from Y axis to Y axis, and the second end tool-taking grooves 413, 433 rotate upwards form the Y axis to Y axis. It can be found that, the first and the second tool-changing arms 41, 43 rotate about 180 degrees from horizontal state to the vertical state. After the first and the third tool-changing arms 41, 43 have rotated a predetermined angle (about 45 degrees), the second and the fourth tool-changing arms 42, 44 start to rotate slowly in the clockwise direction. But their rotating angles are different from that of the first and the third tool-changing arms 41, 43, and the first end tool-taking grooves 422, 442 are made to rotate downwards from Y axis to the Y axis, and the second end tool-taking grooves 423, 443 are made to rotate upwards from Y axis to Y axis. It can be found that, the rotating angles of the second and the fourth tool-changing arms 42, 44 are about 180 degrees.

As known from FIG. 7, even four tool-changing arms can utilize the differential rotation caused by the rotating direction, rotating angle and the rotation starting time to make respective tool-changing as have enough space to avoid each other for preventing from colliding with the tools.

While we have shown and described various embodiments in accordance with the present invention, it is clear to those skilled in the art that further embodiments may be made without departing from the scope of the present invention.

What is claimed is:

1. A multi-axis automatic tool-changing system for an automatic machining center, the machining center comprising a workpiece-holding table, a mainframe, a tool magazine disposed adjacent to one side of the mainframe, and a plurality of tool-changing arms; the tool magazine including a plurality of tool pots, and each tool pot being used for an insertion of a tool; the multi-axis automatic tool-changing system being characterized in that:

the tool magazine is disposed with a plurality of tool-changing positions;

the mainframe is disposed with a plurality of machining devices;

between each machining device and each tool-changing position is disposed one of the tool-changing arms, each tool-changing arm includes an axis at a center thereof and is driven by a driving device to rotate around its axis, each tool-changing arm further includes a first end tool-taking groove and a second end tool-taking groove, each of the tool-taking grooves of a first of the tool-changing arms opens towards a first circumferential direction with respect to the rotation of the tool-changing arms, each of the tool-taking grooves of a second of the tool-changing arms opens towards the opposite circumferential direction, and the axes of rotation of the tool-changing arms are offset from one another;

each tool pot located correspondingly to a respective one of each of the tool-changing positions is controlled by a tool-reversing unit, so as to make the tool pot and the tool thereof parallel to the longitudinal axis of a respective one of the machining devices, then each tool-changing arm utilizes its first end and the second end tool-taking grooves to grasp and exchange tools between the machining devices and the tool-changing positions.

2. The multi-axis automatic tool-changing system for an automatic machining center as claimed in claim 1, wherein the tool magazine is a chain-type tool magazine.

3. The multi-axis automatic tool-changing system for an automatic machining center as claimed in claim 1, wherein the first tool-changing arm is located adjacent the second tool-changing arm.

4. The multi-axis automatic tool-changing system for an automatic machining center as claimed in claim 1, wherein the first and the second tool-changing arms are rotated in opposite directions.

5. The multi-axis automatic tool-changing system for an automatic machining center as claimed in claim 1, wherein the first and the second tool-changing arms rotate 90 degrees in opposite directions, in a differential rotation manner, respectively.

6. The multi-axis automatic tool-changing system for an automatic machining center as claimed in claim 1, wherein the first and the second tool-changing arms rotate 180 degrees in opposite directions, in a differential rotation manner, respectively.

7. The multi-axis automatic tool-changing system for an automatic machining center as claimed in claim 1, wherein the mainframe includes at least four of the machining devices, the tool magazine includes at least four of the tool-changing positions, between respective machining devices and respective tool-changing positions are located the first tool-changing arm, the second tool-changing arm, a third tool-changing arm and a fourth tool-changing arm, respectively.

8. The multi-axis automatic tool-changing system for an automatic machining center as claimed in claim 7, wherein circumferential opening directions of the first end tool-taking grooves of the first and the third tool-changing arms are the same, and circumferential opening directions of the second end tool-changing grooves of the first and the third tool-changing arms are also the same, circumferential opening directions of the first end tool-taking grooves of the second and the fourth tool-changing arms are the same, and circumferential opening directions of the second end tool-taking grooves of the second and the fourth tool-changing arms are also the same, circumferential opening directions of the first end tool-taking grooves of the first and the second tool-changing arms are opposite, and circumferential opening directions of the second end tool-taking grooves of the first and the second tool-changing arms are also opposite.

9. The multi-axis automatic tool-changing system for an automatic machining center as claimed in claim 8, wherein the first and the second tool-changing arms rotate 90 degrees in opposite directions, in a differential rotation manner, respectively.

10. The multi-axis automatic tool-changing system for an automatic machining center as claimed in claim 8, wherein the first and the second tool-changing arms rotate 180 degrees in opposite directions, in a differential rotation manner, respectively.

* * * * *